June 29, 1926. 1,590,580
W. R. HUME
PIPE JOINT
Filed April 16, 1923
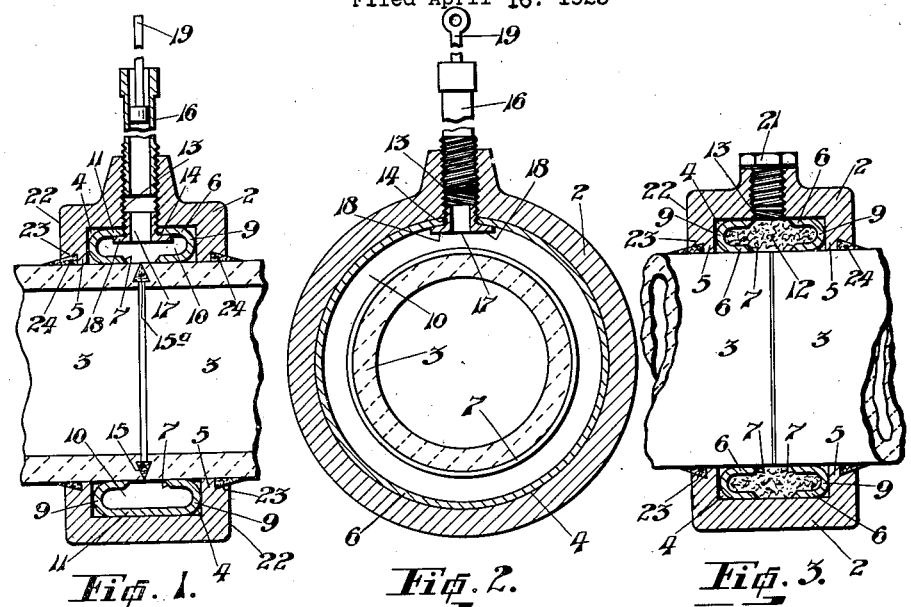
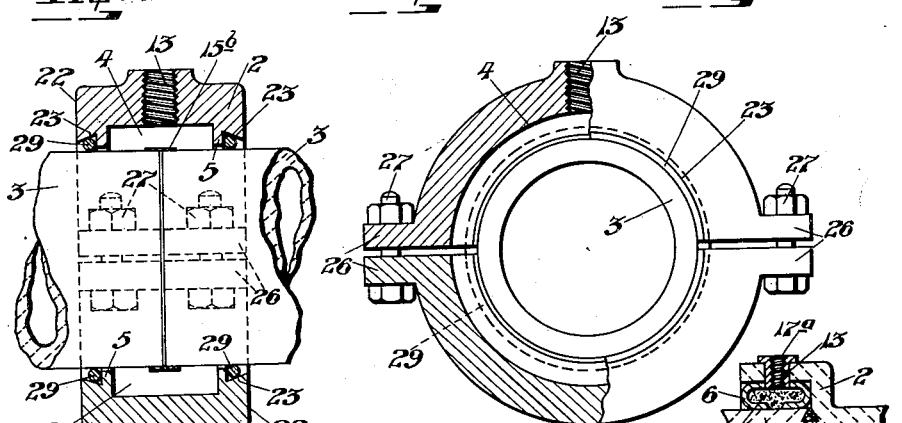
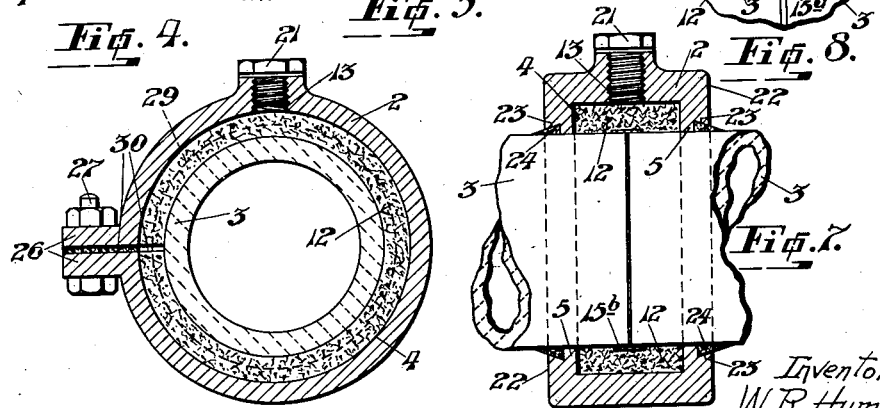
Inventor:
W. R. Hume,
by Emil Banelyeke
Attorney.

Patented June 29, 1926.

1,590,580

UNITED STATES PATENT OFFICE.

WALTER REGINALD HUME, OF MELBOURNE, VICTORIA, AUSTRALIA, ASSIGNOR TO HUME PIPE COMPANY (AUSTRALIA) LIMITED, OF MELBOURNE, AUSTRALIA.

PIPE JOINT.

Application filed April 16, 1923, Serial No. 632,468, and in Australia April 20, 1922.

This invention relates to joints for concrete and other piping and its object is to provide a highly efficient and durable pipe joint in which a certain amount of flexibility is provided for to allow for longitudinal expansion and contraction of the joint under variations in temperature and other conditions. In addition, the improved joint is readily applicable to plain ended pipes thereby dispensing with the necessity of flanges, spigots or like special formations of the pipe ends. The invention is, however, also applicable to the jointing of pipes having faucet and spigot or like ends as will be hereinafter understood.

A characteristic feature of the invention resides in the formation of a pipe joint by the introduction under pressure of a plastic bituminous jointing material into an internal annular cavity or chamber formed in a suitable collar or like housing which surrounds the abutting or adjoining pipe ends. Further features of the invention reside in the means of retaining said plastic jointing material within the annular cavity in the housing or collar. Such means may include one or more lead or like flexible jointing or sealing rings suitably placed inside the annular cavity, or in recesses at the ends of the collar previous to the introduction of the plastic bituminous material. In another form of the invention the lead or like sealing rings may be dispensed with and the ends of the housing or collar provided with annular recesses or grooves to accommodate suitable caulking material such as cement, lead or the like which thus seals the ends of the joint around the inner periphery of the housing or collar.

By means of such sealing devices the annular cavity or chamber in the collar or housing is effectively sealed to prevent the plastic material therein extruding around the circumference of the pipe.

The features of invention will, however, be hereinafter more fully described and defined in the appended claims.

Referring to the drawings which form part of this specification:—

Figure 1 is a longitudinal sectional view showing one embodiment of the invention, the plastic jointing material being emitted from the annular chamber in the housing.

Figure 2 is a cross section of Figure 1.

Figure 3 is a sectional view of a modified form of the invention showing the plastic jointing material within the annular chamber of the housing.

Figure 4 is a sectional view of a further modified form wherein the collar or housing is formed in two halves adapted to be contracted around the meeting pipe ends to thereby compress lead or like sealing rings against the periphery of the pipe.

Figure 5 is a part sectional end view of Figure 4.

Figure 6 shows a still further modified form of the invention wherein the collar or housing is formed as a single divided member.

Figure 7 is a longitudinal section of a modification in which the lead or flexible sealing rings are dispensed with and the plastic jointing material is prevented from extruding from the collar or housing by caulking material inserted in annular grooves at the ends of the housing to form a seal between the latter and the periphery of the pipe.

Figure 8 is a fragmentary sectional view showing the invention applied to the jointing of faucet and spigot ended pipes.

According to the embodiment of the invention illustrated in Figures 1 and 2 the collar or housing 2 which is preferably of metal, is formed in one piece and is adapted to surround the abutting ends of the pipes 3 to be united. Formed in said collar or housing is an internal annular cavity or chamber 4 extending around the joint. The end walls of this cavity 4 are formed by annular projecting portions or ribs 5 the inner circumferential edges of which are adapted to engage or lie close to the outer periphery of the pipes 3.

The cavity 4 accommodates an internal jointing or sealing ring 6 of suitable flexible material, preferably lead. Rubber, leather or other suitable flexible material may, however, be employed for the purpose if desired. The circumferential edge portions 7 of this sealing ring 6 are turned inwardly towards each other as in Figure 1 to thereby form within the sealing ring an annular receptacle indicated at 10 and having opposed U shaped side walls 9 which are connected by the intermediate part of back 11 of the sealing ring 6. The opposed inturned edges of the sealing ring 6 do not meet but are spaced apart, this space between the edges being located at the centre of the joint where the pipe ends 3 meet or adjoin each other, as in Figure 1.

Accommodated by the annular receptacle 10 in the sealing ring 6 is a filling and jointing material indicated at 12 in Figures 3, 6, 7 and 8, and consisting preferably of a plastic bituminous composition such as described in prior Commonwealth Patents No. 12,435 of 1914 and No. 4,087 of 1917. This jointing material is forced into the receptacle 10 under pressure as hereinafter described, so that by entering the U shaped side portions 9 of the sealing ring 6 the inturned edge portions 7 thereof are pressed tightly against the circumference of the pipes 3. By this means the plastic material is effectively retained within the collar or housing 2. The plastic jointing material 12 also extends across the space between the edges of the sealing ring 6 and thus forms an effective closure around the abutting or adjoining extremities of the pipes 3.

The pipe extremities may be plain or recessed as at 15 to accommodate an insertion 15a of the aforesaid plastic jointing material between the end faces of the pipes as described in the prior Commonwealth patents above referred to. This plastic insertion is introduced before the pipe ends are brought together and prevents the plastic material 12 from being forced into the interior of the pipe. A wrapping or binding 15b (Figures 4 and 7) of suitable material such as fabric or thin lead may also be placed around the joined pipe ends as mentioned in the aforesaid prior Patent No. 12,435/14.

The plastic jointing material 12 is introduced into the annular chamber 4 and receptacle 10 by way of a radial orifice 13 which extends through the housing or collar 2 and coincides with an orifice 14 in the intermediate portion or back 11 of the sealing ring 6. The orifice 13 may be threaded to detachably receive an externally threaded tube 16 which constitutes a pump barrel extending outwardly from the housing 2.

A hollow lock nut or nipple 17 having an out-turned shoulder or flange 18 is passed through the orifice 14 of the sealing ring 6 and screwed into the inner end of the threaded orifice 13 as in Figures 1 and 2 so that the flange 18 of the nut 17 presses and holds the ring 6 in proper relative position within the housing 2.

By means of a suitable pump plunger 19 inserted in the aforesaid tube or barrel 16, the plastic jointing material 12 is forced therefrom through the orifice 13 and nipple 17 into the annular receptacle 10 within the housing 2. The plastic jointing material is thus introduced under pressure by the pump 19 until it completely fills the receptacle 10 within the ring 6 thereby completely encircling the joined pipe ends 3 and pressing the inturned circumferential edges 7 of the sealing ring inwardly against the outer circumference of the pipe. It will be obvious that, if desired, a quantity of the plastic material 12 may be first poured or otherwise introduced into the interior of the housing and the remainder forced in under pressure to provide the necessary tight sealing of the joint.

When the plastic material 12 has been introduced into the joint as aforesaid the threaded tube 16 forming the pump barrel may be removed, and the orifice 13 closed by a plug as indicated at 21 in Figure 3 or other suitable closure such for instance as a filling of cement or the like.

The end faces 22 of the collar or housing 2 may be provided with annular recesses or grooves 23, the peripheral wall of these recesses being preferably of undercut or wedge shape as shown thus forming an annular space at each end of the housing 2 for the reception of some suitable caulking material such as cement, lead or the like indicated at 24. By this means the interior of the collar or housing 2 may be sealed around the periphery of the pipe at a point removed from the meeting ends thereof and such sealing means may be employed either in conjunction with the rings 6, as in Figures 1 to 3, or independently thereof as hereinafter described with reference to Figure 7.

In Figure 3 it will be seen that instead of a single ring two separate flexible sealing rings 6 are accommodated in the annular cavity 4 of the collar or housing 2. These sealing rings 6 are of substantially U-shape in cross section and the two rings are opposed to each other as shown, so that the inner edge portions 7 of the two rings bear against the periphery of the pipe and a space is formed between the two channel like rings to permit the plastic material 12 to enter from the orifice 13 of the surrounding collar or housing 2 as already mentioned.

Where two sealing rings 6 are provided as in Figure 3 the joint between the pipe extremities is accessible through the plastic jointing material 12 owing to the space between the opposed rings. The proximity of said pipe extremities to each other and the condition of the joint may thus be ascertained by introducing a knife or other instrument through the plastic material 12 by way of the radial orifice 13.

In a further modified form of the invention as illustrated in Figures 4 and 5 the collar or housing 2 is divided longitudinally of the pipe to form two or more separate sections each of which is provided with flanges 26 or the like whereby the housing may be clamped or contracted by bolts 27 or the like around the pipe ends 3. This divided collar or housing also has the internal annular cavity or chamber 4 to accommodate the plastic jointing material 12 around the abutting pipe ends. Sealing rings 29 preferably of lead or other suitable soft material are provided with this embodiment of the invention, said rings being preferably of approximately circular form in cross section such material being commonly known as "lead wire". The invention is however not limited to this particular material or cross sectional shape.

In assembling a joint in accordance with Figures 4 and 5 the two sections of the housing 2 are placed around the adjoining pipe ends 3 with the sealing rings 29 in the grooves 23 at the ends of the housing. The latter is then contracted upon the pipe so that the sealing rings 29 are compressed against the outer circumference of the pipe causing the soft metal or material of the rings to spread and thus form an effective seal between the pipe and the housing or collar at each end of the latter. This spreading action is augmented by the undercut or wedge shape of the grooves 23 accommodating the sealing rings 29, said grooves being more or less filled by the compressed sealing rings 29. The plastic jointing material 12 may now be introduced into the internal annular cavity 4 between the sealing rings 29 this introduction of the plastic material 12 being preferably effected by first pouring the material in through the orifice 13 in the wall of the cavity 4 and subsequently pumping or forcing in the material under pressure as before described.

Besides forming an effective fluid tight joint this method of introducing the plastic material under pressure ensures an indication of the state of the joint owing to the extrusion of the plastic material 12 through any crevices or leakages which may exist at the ends of the housing 2. Any deficiency in the joint may thus be corrected.

The overhanging outer edge of the groove 23 at each end of the housing 2 is preferably spaced a slight distance from the circumference of the pipe when the housing is clamped thereon. It is thus possible to insert cement or other suitable caulking material into said end grooves 23 to complete the sealing of the joint in conjunction with the sealing rings 29 if so desired.

Instead of forming the housing or collar 2 in separate contractible sections as above mentioned it may be in the form of a single divided member as shown in Figure 6 where the collar is of a springy nature so that by means of the clamping bolts 27 and flanges 26 it may be contracted around the pipe ends to compress the sealing rings 29 against the pipe as already described with reference to Figures 4 and 5. In both these latter embodiments a suitable packing material may be introduced between the meeting faces of the divided housing as at 30 in Figure 6 to thus ensure a tight closure of the cavity 4 when the collar or housing is contracted on the pipe.

As seen in Figure 7, the flexible sealing rings 6 and 29 may be entirely eliminated and the plastic jointing material 12 is prevented from extruding at the ends of the collar or housing solely by means of the caulking material 24, in the recesses or grooves 23.

In applying the invention to the jointing of faucet and spigot ended pipes the faucet or socket may form the enclosing collar or housing 2 as in Figure 8. In this case the flexible sealing ring 6 may be accommodated in the annular chamber formed between the spigot and faucet and the plastic jointing material 12 may be introduced as aforesaid by way of the radial orifice 13 formed through the socket or housing 2. This orifice may be fitted with an internally threaded metallic nipple 17$^a$ to receive the pump barrel 16 and closure 21 and to retain the sealing ring 6 in correct position.

It will be evident from the foregoing description that various alterations, modifications and additions may be incorporated in the improved joint without departing from the spirit and scope of the invention as defined by the appended claim.

Having now described my invention what I claim as new and desire to secure by Letters Patent is:—

A pipe joint comprising an annular collar surrounding adjacent pipe ends to form an annular chamber, said collar having an orifice therein; a sealing ring within said chamber, said ring engaging both pipes and comprising two opposed U-shaped portions, each portion having a free edge engaging a pipe end; a plastic jointing material pressed in said ring through said orifice in order to force said free edges tightly against the outside of the pipes; a plug for closing said orifice after introduction of said plastic material; and further sealing means at the ends of the pipes to prevent the fluid pressure in the pipes from acting on the plastic material.

WALTER REGINALD HUME.